(12) United States Patent
Kato

(10) Patent No.: US 7,219,882 B2
(45) Date of Patent: May 22, 2007

(54) FLUID-FILLED VIBRATION DAMPING BUSHING

(75) Inventor: Kazuhiko Kato, Komaki (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 199 days.

(21) Appl. No.: 11/171,454

(22) Filed: Jul. 1, 2005

(65) Prior Publication Data

US 2006/0006592 A1 Jan. 12, 2006

(30) Foreign Application Priority Data

Jul. 8, 2004 (JP) ............................ 2004-202406

(51) Int. Cl.
F16F 5/00 (2006.01)
F16F 9/00 (2006.01)
F16F 13/00 (2006.01)
F16F 15/00 (2006.01)
F16M 5/00 (2006.01)

(52) U.S. Cl. ................. 267/140.12; 267/141.2
(58) Field of Classification Search ........... 267/140.12, 267/141.2, 219
See application file for complete search history.

(56) References Cited

U.S. PATENT DOCUMENTS

| | | | |
|---|---|---|---|
| 4,588,174 A | 5/1986 | Konishi | |
| 4,919,401 A | 4/1990 | Yano | |
| 5,088,701 A * | 2/1992 | Nanno | 267/140.12 |
| 5,213,313 A * | 5/1993 | Tsutsumida et al. | 267/140.12 |
| 5,221,077 A * | 6/1993 | Noguchi | 267/140.12 |
| 5,299,788 A * | 4/1994 | Kanda | 267/140.12 |
| 5,489,086 A | 2/1996 | Kanda | |
| 5,725,202 A | 3/1998 | Nakamura et al. | |
| 6,029,960 A * | 2/2000 | Gab | 267/140.12 |
| 6,561,501 B2 * | 5/2003 | Bouhier et al. | 267/140.12 |
| 6,910,670 B2 * | 6/2005 | Kato | 248/608 |
| 2004/0084601 A1 * | 5/2004 | Kato | 248/562 |
| 2005/0230889 A1 * | 10/2005 | Minamisawa | 267/140.12 |
| 2007/0045918 A1 * | 3/2007 | Thornhill et al. | 267/140.12 |

FOREIGN PATENT DOCUMENTS

| | | | |
|---|---|---|---|
| JP | 04266640 | * | 9/1992 |
| JP | 04327039 | * | 11/1992 |
| JP | 05065933 | * | 3/1993 |
| JP | 06207638 | * | 7/1994 |
| JP | A 7-174175 | | 7/1995 |
| JP | A 8-193639 | | 7/1996 |
| JP | A 2003-194138 | | 7/2003 |
| JP | A 2003-269507 | | 9/2003 |
| JP | A 2003-269525 | | 9/2003 |

* cited by examiner

Primary Examiner—Devon Kramer
(74) Attorney, Agent, or Firm—Oliff & Berridge, PLC

(57) ABSTRACT

A fluid-filled vibration damping bushing including an inner tubular metal member and an outer peripheral sleeve elastically connected via a base rubber interposed therebetween with first and second fluid chambers formed therein. A stopper rubber constituted as a separate element from the base rubber, disposed at a circumferential location corresponding at a minimum to either the first or second fluid chamber, for restricting relative displacement of the inner tubular metal member and outer tubular metal member in an axis-perpendicular direction. The stopper rubber is formed separately from an orifice member and bonded to one axial end portion of the outer tubular metal member at a location outside the first and second fluid chambers so as to face toward the inner tubular member. The outer tubular metal member with the stopper rubber attached thereto is inserted onto the outer peripheral sleeve from the other axial end thereof.

6 Claims, 18 Drawing Sheets

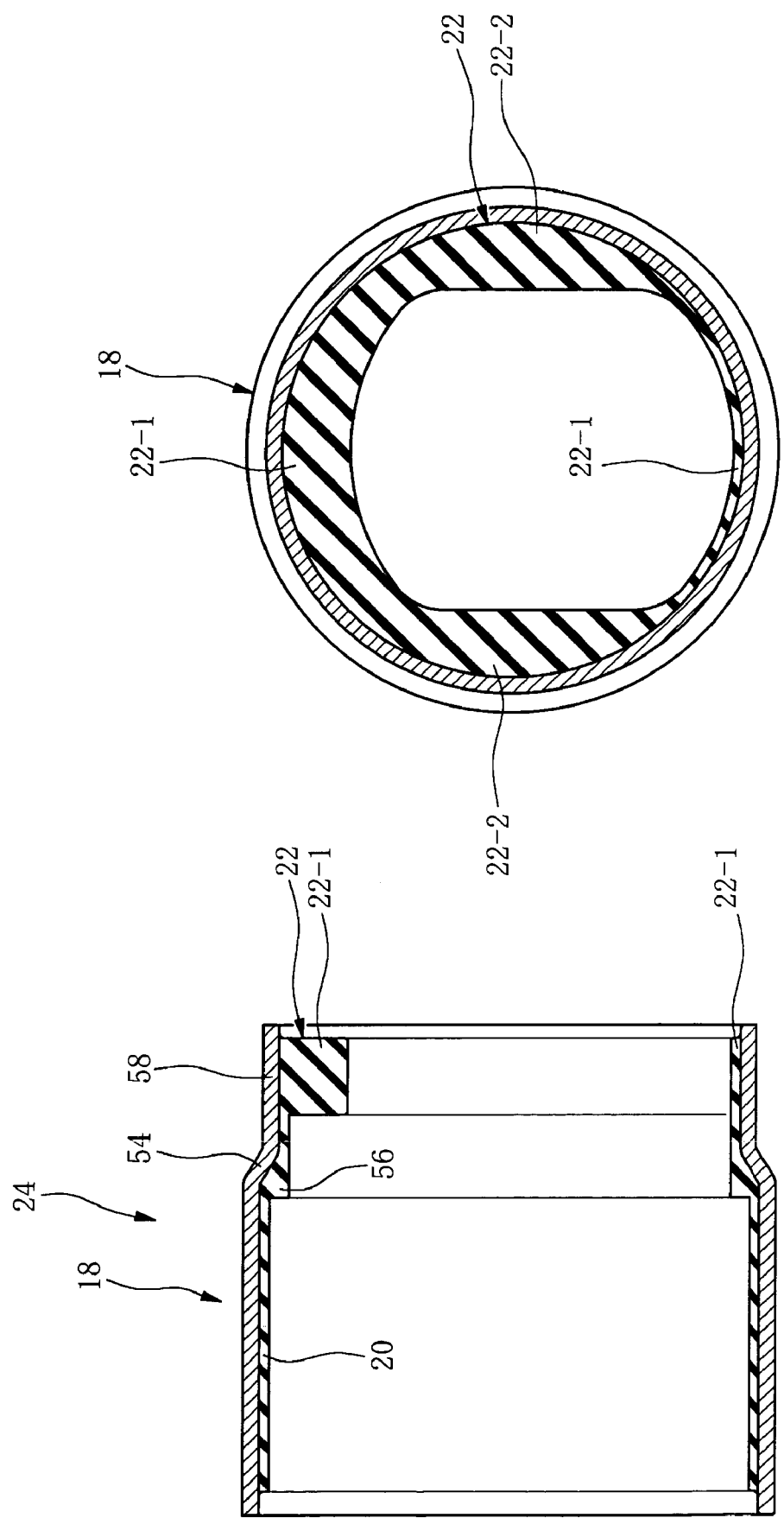

PRIOR ART

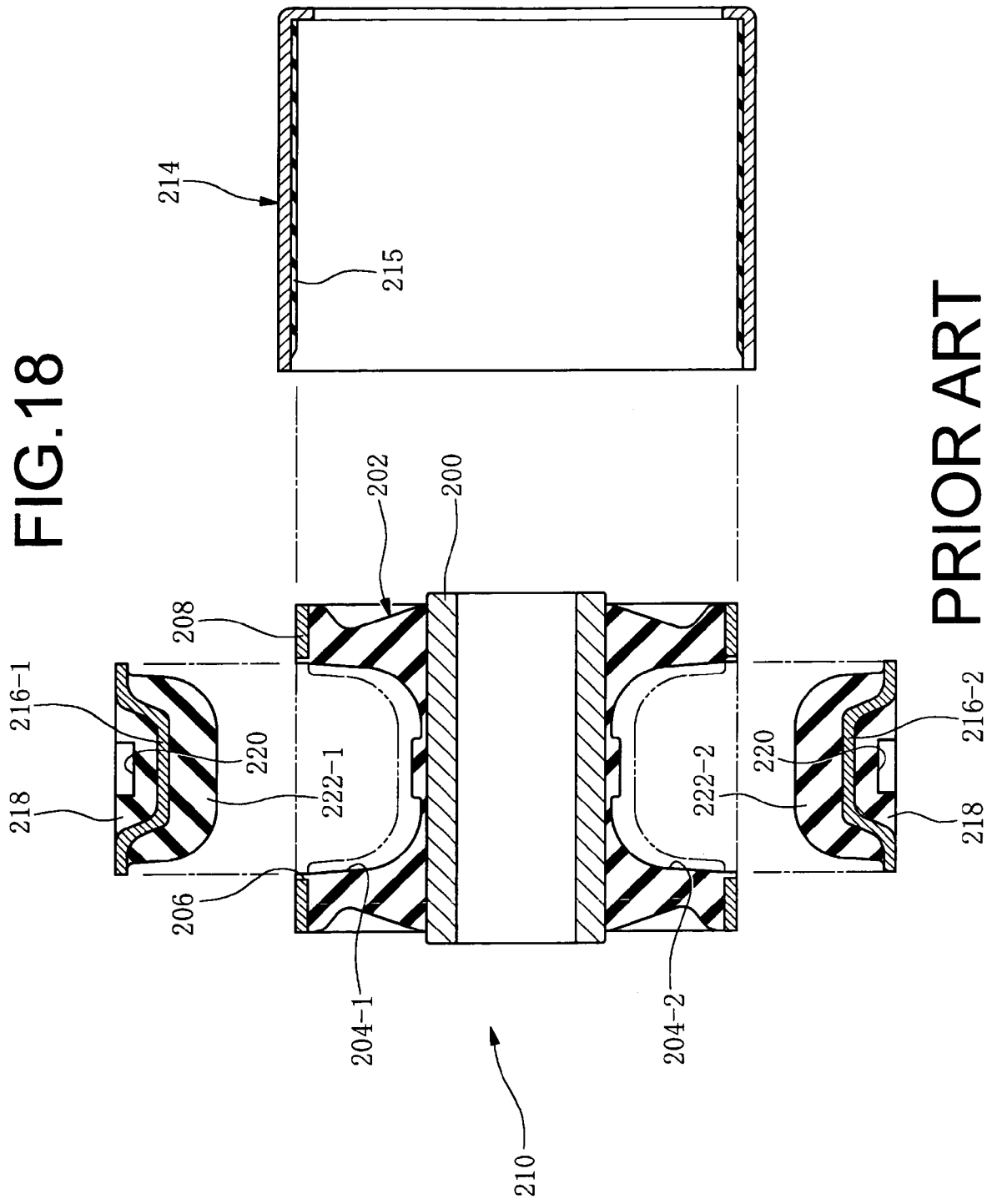

FLUID-FILLED VIBRATION DAMPING BUSHING

INCORPORATED BY REFERENCE

The disclosure of Japanese Patent Application No. 2004-202406 filed on Jul. 8, 2004 including the specification, drawings and abstract is incorporated herein by reference in its entirety.

BACKGROUND OF THE INVENTION

1. Field of the Invention

This invention relates to a fluid-filled vibration damping bushing suitable for use as an automotive suspension bushing or other application.

2. Description of the Related Art

In automotive suspensions to date, a vibration damping rubber is interposed between an suspension arm and a linking portion to a body side, to absorb vibration between the suspension arm and the body side. Conventionally, a tubular mounting type suspension bushing was used as a suspension bushing of this kind, so as to be able to absorb vibration while ensuring oscillation of the suspension arm. An example of a vibration damping bushing for use as a suspension bushing of this kind is depicted in FIGS. 16–18. The illustrated vibration damping bushing is of fluid-filled type having a fluid sealed within a fluid chamber.

In FIGS. 17A and 17B, a fluid-filled vibration damping bushing includes an inner tubular metal member 200 and a base rubber 202 integrally bonded by vulcanization to the outer circumferential surface of the inner tubular metal member 200. A pair of first and second fluid chambers (hereinafter simply termed fluid chambers) 204-1, 204-2 mutually independent of one another are formed in the base rubber 202, in the form of depressions recessed towards the inner tubular metal member 200 side from the outer circumferential surface thereof.

At the outer circumferential surface of the base rubber 202, an outer peripheral sleeve (here fabricated of metal) 208 having an aperture window 206 of shape corresponding to the shape of the fluid chamber 204-1, 204-2 opening on the outer circumferential surface is integrally affixed to the base rubber 202 by means of vulcanization bonding. With the fluid-filled vibration damping bushing of this example, bushing body 210 is constituted as a integrally vulcanized unit, by the aforementioned inner tubular metal member 200, base rubber 202, fluid chambers 204-1, 204-2, and outer sleeve affixed to the outer circumferential surface of the base rubber 202. A rubber wall 212 divides the fluid chambers 204-1 and 204-2.

An outer tubular metal member 214 covers openings of the fluid chambers 204-1, 204-2 from an outer circumferential side of medial plates (orifice metal members) 216-1, 216-2, and a rubber layer 218 is provided on an outer circumferential sides of the medial plates 216-1, 216-2 (these will be described later). A seal rubber layer 215 is integrally bonded by vulcanization to an inner circumferential surface of the outer tubular metal member 214 over the entire axial length, thereby giving a fluid-tight sealing to the fluid chambers 204-1, 204-2 and an orifice passage 220 (described later) by means of this seal rubber layer 215. This outer tubular metal member 214 is fastened by caulking at both axial ends thereof to the aforementioned bushing body 210.

FIG. 17A shows metal medial plates 216-1, 216-2, 216-3 embedded within the base rubber 216-4. Of these medial plates, plates 216-1, 216-2, and 216-3 form orifice metal members for the purpose of forming an orifice passage 220. A rubber layer 218 is integrally bonded by vulcanization to an outer peripheral side of each medial plate, forming at an outer circumferential surface thereof the orifice passage 220 that connects the fluid chambers 204-1, 204-2. The fluid sealed within the fluid chambers 204-1, 204-2 is able to flow from one side to the other and back again through this orifice passage 220.

The medial plates 216-1, 216-2 making up the orifice metal members are constituted as separate elements from the other medial plates 216-3, 216-4, i.e. as separate elements from the bushing body 210. At the inner circumferential surfaces of the medial plates 216-1, 216-2, stopper rubbers 222-1, 222-2 for restricting relative displacement of the inner tubular metal member 200 and the outer tubular metal member 214 in the axis-perpendicular direction, i.e. for restricting elastic deformation of the base rubber 202, are integrally bonded vulcanization projecting inward into the fluid chambers 204-1, 204-2 towards the inner tubular metal member 200.

This fluid-filled vibration damping bushing is used disposed so that the aforementioned fluid chambers 204-1 and 204-2 are situated along the principal vibration input direction. When vibration is input in the axis-perpendicular direction across the inner tubular metal member 200 and the outer tubular metal member 214 in the same direction, the base rubber 202 undergoes elastic deformation, and the liquid inside flows between the fluid chambers 204-1, 204-2 through the orifice passage 220, so that the vibration is absorbed effectively on the basis of liquid column resonance action at that time. Where elastic deformation of the base rubber 202 in the same direction attempts to go above a given level, the stopper rubbers 222-1, 222-2 come into abutment with the inner tubular metal member 200, restricting deformation above a given level.

The metal outer peripheral sleeve 208 has the following significance. Where the base rubber 202 and the outer tubular metal member 214 are affixed without interposing this kind of outer peripheral sleeve 208, the bushing body 210 including the base rubber 202 is press-fit into the interior of the outer tubular metal member 214. However, in this instance, the problem of appreciable deformation and unstable shape of the base rubber can occur, and additional problems, such as to the need to for additional process after press-metal member in order subsequently bond the base rubber 202 and the outer tubular metal member 214 (secondary vulcanization), and the need for a subsequent process to seal the liquid in the fluid chambers 204-1, 204-2, occur as well.

In contradistinction thereto, where the rigid metal outer peripheral sleeve 208 is attached to the outer circumferential surface of the base rubber 202, the base rubber 202 and the outer tubular metal member 214 can be fastened together simply by constricting the outer tubular metal member 214 in the diameter-reducing direction, and moreover this constricting operation can be carried out in liquid, so that it becomes a simple matter to seal the liquid within the fluid chambers 204-1, 204-2.

As shown in FIG. 16 and FIG. 18, these stopper rubbers 222-1, 222-2 are also constituted as separate elements from the bushing body 210, and the medial plates 216-1, 216-2 making up the orifice metal members are attached to the bushing body 210 by means of inserting them, together with the rubber layer 218 to the outer peripheral side thereof into the fluid chambers 204-1, 204-2 from the axis-perpendicular direction.

One reason for constituting the stopper rubbers 222-1, 222-2 as separate elements from the bushing body 210 and subsequently attaching them is that if the stopper rubbers 222-1, 222-2 and the base rubber 202 were constituted as a single body, the stopper rubbers 222-1, 222-2 and the base rubber 202 would inevitably have the same rubber hardness, whereas if these are constituted separately, the rubber hardness of the stopper rubbers 222-1, 222-2 can be varied freely relative to the rubber hardness of the base rubber 202, making it possible for vibration absorbing ability and stopper ability to each be better exhibited in the fluid-filled vibration damping bushing.

However, where the stopper rubbers 222-1, 222-2 are constituted separately from the base rubber 202 and designed to be attached to the base rubber 202, the fluid-filled vibration damping bushing requires a greater number of vulcanized parts (vulcanized rubber components) (here, four vulcanized parts are required), as a result of which the problem of higher cost of the fluid-filled vibration damping bushing occurs.

Additionally, as the stopper rubbers 222-1, 222-2 are situated within the fluid chambers 204-1, 204-2, during stopper action the stopper rubbers 222-1, 222-2 come into abutment with their partner components via the liquid, creating the problem of reduced frictional force and difficulty in achieving adequate stopper performance by the stopper rubbers 222-1, 222-2 (i.e. a tendency to overstroke). Additionally, there is a risk that abraded particulate material produced during stopper action of the stopper rubbers 222-1, 222-2 will be drawn into the orifice passage 220 and constrict, or in some instances clog up, the orifice passage 220.

An additional problem is that, in the event of input in the twisting direction between the inner tubular metal member 200 and the outer tubular metal member 214, i.e. input of force in a direction tilting their axes, the stopper rubbers 222-1, 222-2 can undergo appreciable strain due to abutment against the base rubber 202 in which the fluid chambers 204-1, 204-2 are formed.

While a number of problems pertaining to fluid-filled vibration damping bushings used as suspension bushings have been mentioned above, fluid-filled vibration damping bushings of this kind are used widely at various locations, with similar problems occurring in these instances as well. Fluid-filled vibration damping bushings that have a pair of stoppers for restricting displacement in the axis-perpendicular direction are taught in JP-A-8-193639 and JP-A-2003-269525, but these differ from the present invention in that the stopper pair is disposed within the fluid chambers.

JP-A-2003-269507 teaches the element of constituting a pair of annular stopper rubbers as separate elements from the base rubber and disposing these at each axial end. However, JP-A-2003-269507 does not teach a vibration damping bushing of fluid-filled, thereby being directed instead to a different purpose.

SUMMARY OF THE INVENTION

It is an object of the present invention to provide a fluid-filled vibration damping bushing that ensures the required vibration isolating or damping ability and stopper ability, while reducing the number of vulcanized parts required overall and the resultant manufacturing cost.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid-filled vibration damping bushing comprising: (I) a bushing body having an inner tubular metal member, an outer peripheral sleeve disposed coaxially about the inner tubular metal and a base rubber interposed between and elastically connected the inner tubular metal member and the outer peripheral sleeve, the base rubber having a pair of depressions recessed towards an inner tubular metal member side and open in an outer circumferential surface of the base rubber, so as to provide mutually independent first and second fluid chambers having a non-compressible fluid sealed therein, and the outer peripheral sleeve having a pair of aperture window of shape corresponding to openings of the first and second fluid chamber; (II) an orifice member at least partially defining an orifice passage extending between the openings of the first and second fluid chamber so that the fluid sealed within the first and second fluid chambers is caused to flow between the chambers; (III) an outer tubular metal member having a seal rubber layer integrally bonded by vulcanization to an inner circumferential surface thereof for liquid-tight sealing of the first and second fluid chambers, and fastened to an outer circumferential surface of the outer peripheral sleeve via the seal rubber layer, closing off the opening of the first and second fluid chambers; and (IV) a stopper rubber constituted as a separate element from the base rubber, disposed at a circumferential location corresponding at a minimum to either the first or second fluid chamber, for restricting relative displacement of the inner tubular metal member and outer tubular metal member in the axis-perpendicular direction, wherein the stopper rubber is formed separately from the orifice member and is bonded to a first axial end portion of the outer tubular metal member at a location outside the first and second fluid chambers so as to face toward the inner tubular member, and the outer tubular metal member with the stopper rubber attached thereto is inserted onto the bush body from an other axial end thereof.

According to a second mode of the invention provides a fluid-filled vibration damping bushing according to the aforementioned first mode, wherein the orifice member is an unitary construction continuous in the circumferential direction, and a first end of the bushing body located axially outward of the first and second fluid chambers is made smaller in diameter than an other axial end thereof, the orifice member being assembled by being passed through the small-diameter portion at the first end and inserted in the axial direction as far as the openings of the first and second fluid chambers open in the outer circumferential surface of the bush body.

A third mode of the invention provides a fluid-filled vibration damping bushing according to the aforementioned second mode, wherein a rubber contact portion is formed on the seal rubber layer of the inner circumferential surface of the outer tubular metal member, the rubber contact portion contacting a first axial end of the orifice member opposite from an insertion side of the orifice member, and constituting a seal for the axial end face of the orifice member and a detent for the orifice member.

A fourth mode of the invention provides a fluid-filled vibration damping bushing according to the aforementioned first mode, wherein the orifice member constitutes an unitary structure of C ring shape continuous in the circumferential direction, and the spacing between adjacent circumferential edges of the first fluid chamber and the second fluid chamber in the bushing body to is smaller than the spacing between the circumferential edges of the orifice member, the orifice member being attached by being snapped onto the bushing body in the axis-perpendicular direction.

A fifth mode of the invention provides a fluid-filled vibration damping bushing according to any one of the aforementioned first through fourth modes, wherein the outer tubular metal member has a shoulder portion at a location thereof situated at an axial end of the outer peripheral sleeve in the bushing body, the shoulder portion facing the inner tubular metal member side and contacting the axial end of the outer peripheral sleeve, and wherein the stopper rubber is integrally bonded to an inner circumferential surface of a small-diameter portion continuously extending from the shoulder portion.

According to the present invention, as described hereinabove, the stopper rubber formed separately from the orifice member, is integrally bonded (by vulcanization, for example) facing the inner tubular metal member in an exposed state at the axial end of the outer tubular metal member situated to the outside of the fluid chambers and outwardly in axial direction of the base rubber. Therefore, two components, namely, a rubber unitary vulcanized part consisting of the bushing body, and an unitary vulcanized part composed of the outer tubular metal member, the seal rubber layer, and the stopper rubber, suffice, whereby the number of vulcanized parts may be reduced as compared to the prior art, so that the costs associated with the fluid-filled vibration damping bushing can be lowered.

In the present invention, since the stopper rubber is removed to outside the fluid chambers, and integrally bonded to the outer tubular metal member, the problems occurring in the past in associated with the stopper rubber being situated inside the fluid chamber, namely, the problems of abraded particulate material and of diminished stopper performance due to the liquid, can be resolved. At the same time, the problem of strain of the base rubber, and in particular of significant deformation of the area around the fluid chamber inside faces, due to the stopper rubber contacting the fluid chamber inside faces of the base rubber when twisting force is input can be resolved as well.

In the present invention, the orifice member is the unitary construction continuous in the circumferential direction, and the first end of the bushing body more in the axial direction than the first and second fluid chambers is made smaller in diameter than the other end, with the orifice member attached by being passed through the small-diameter portion at the first end and inserted in the axial direction (Second Mode).

Where the stopper member is integrally bonded by vulcanization to the orifice member as in the past, overall thickness increases, whereby it becomes impossible in actual practice to attach the orifice member by inserting it, together with the rubber stopper, into the base rubber in the axial direction. With the present invention on the other hand, since the stopper rubber is provided outside the fluid chamber in a form separated from the orifice member, it becomes possible for the orifice member to be of unitary construction continuous in the circumferential direction, and to be attached to the base rubber in the axial direction. In this instance, the orifice member, which in the past was constructed of two separate parts, can now be constituted as a single component, whereby it becomes possible to further lower the cost of the fluid-filled vibration damping bushing.

In this instance, on the seal rubber layer of the inner circumferential surface of the outer tubular metal member, there is formed the rubber contact portion contacting the axial end on the opposite side from the insertion side of the orifice member, and constituting the seal for the axial end face of the orifice member and the detent for the orifice member (Third Mode). By means of this arrangement, even where the first axial end of the bushing body is made small in diameter, and the orifice member of unitary construction is attached by insertion in the axial direction so as to pass through this small-diameter portion, it is nevertheless possible to provide a good seal to the axial end face of the orifice member, as well as to detain it therein.

According to the fourth mode, on the other hand, the orifice member constitutes the unitary structure of C ring shape continuous in the circumferential direction, the gap between the circumferential ends of the bushing body adjacent to the first fluid chamber and the second fluid chamber is smaller than the gap between the circumferential ends of the orifice member, and the orifice member is attached by being inserted into the bushing body in the axis-perpendicular direction. Even with this arrangement, the orifice member can be constituted as an unitary structure and attached easily to the bushing body.

In the present invention, the bushing body in the out tubular metal member, more specifically a portion situated at an axial end of the outer peripheral sleeve, constitutes a shoulder portion facing the inner tubular metal member side, and this is made to contact an axial end of the outer peripheral sleeve, with the stopper rubber integrally vulcanization bonded to the inner circumferential surface of the small-diameter portion continuing on from the shoulder portion (Fifth Mode). By means of this arrangement, the gap between the inner tubular metal member and the stopper rubber can readily be given the appropriate spacing needed for stopper action. Additionally, when the outer tubular metal member is fitted externally onto the bushing body, the relative positional relationship of the bushing body and the outer tubular metal member can be readily positioned.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein:

FIGS. 8A and 8B are an axial and transverse cross sectional views of an outer tubular metal member of the fluid-filled vibration damping bushing of FIG. 1;

FIG. 18 is a exploded cross sectional view of the fluid-filled vibration damping busing of FIGS. 17A and 17B.

DETAILED DESCRIPTION OF PREFERRED EMBODIMENTS

Figure 1:
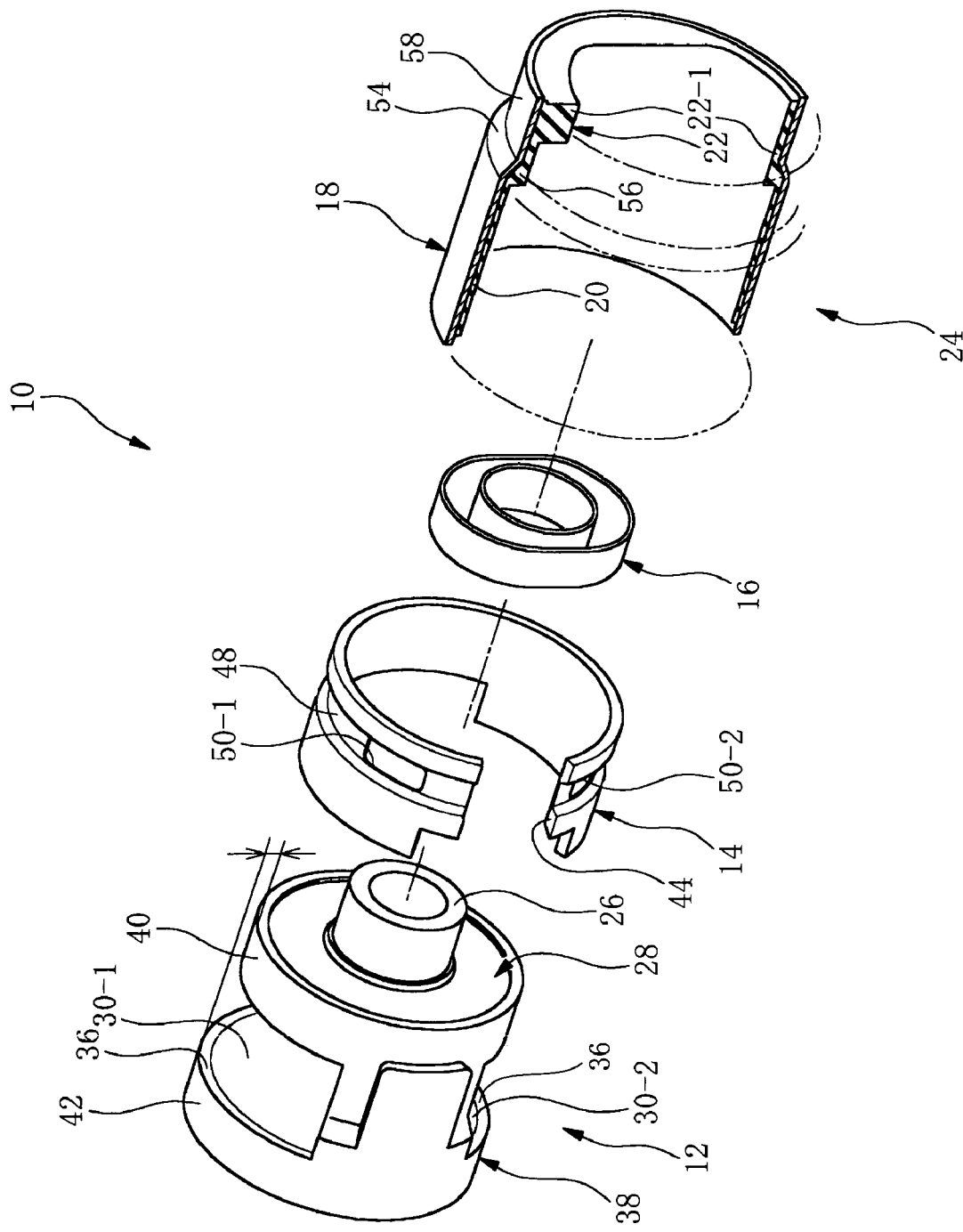
FIG. 1 is a partially cross sectional exploded perspective view of a fluid-filled vibration damping busing of construction according to one embodiment of the invention.
Figure 2:
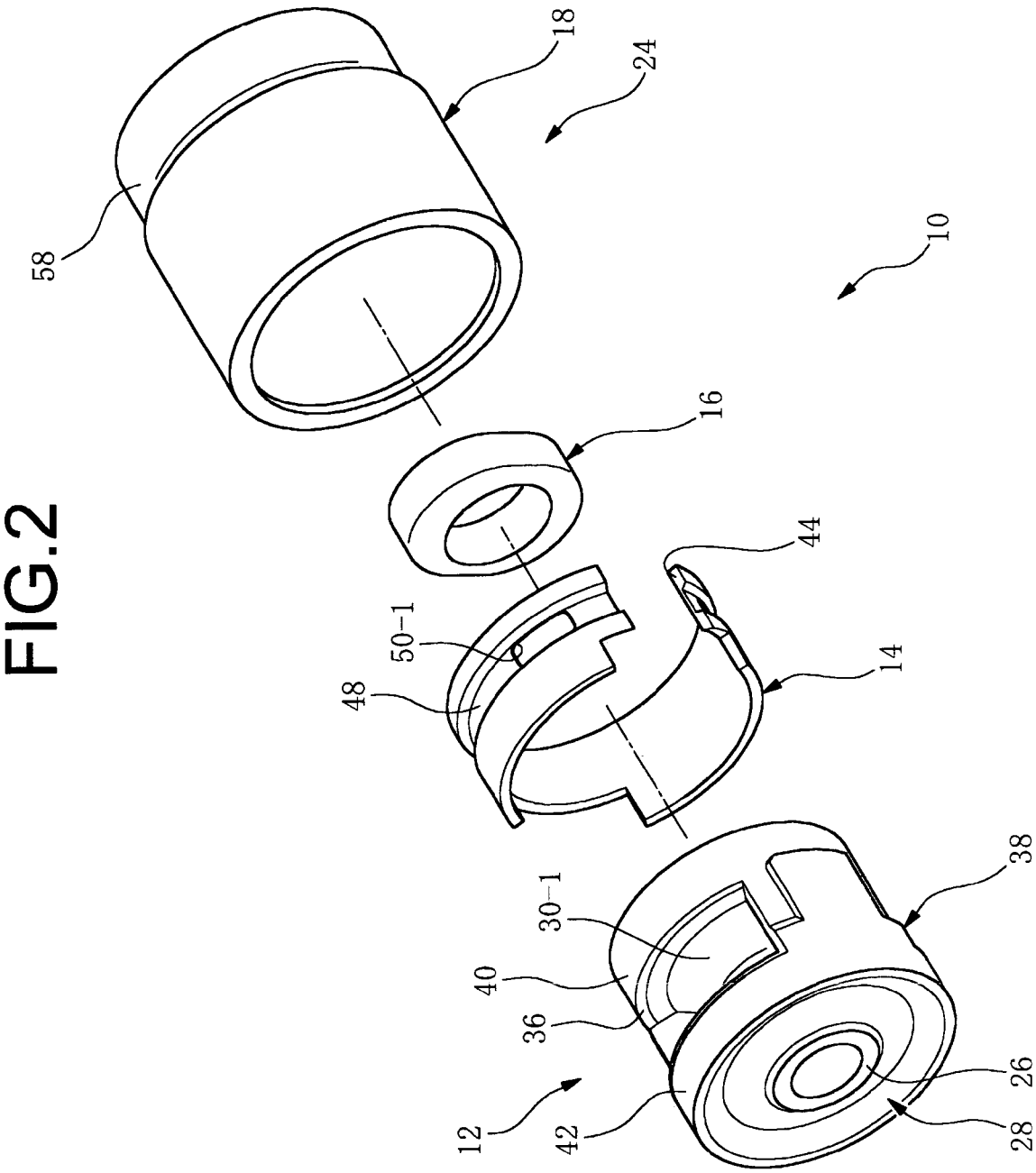
FIG. 2 is another exploded perspective view of the fluid-filled vibration damping bushing of FIG. 1.
Figure 3:
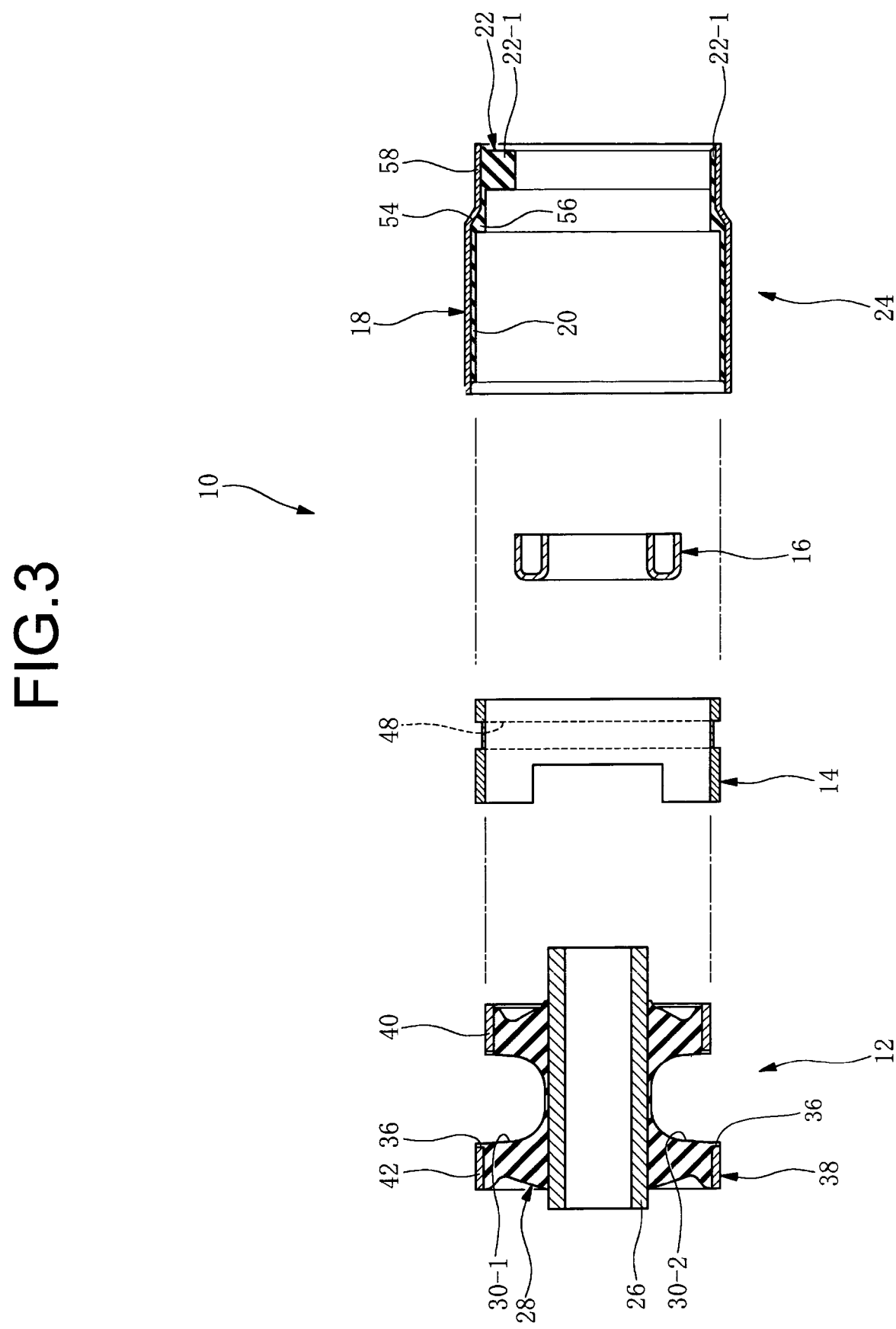
FIG. 3 is an exploded cross sectional view of the fluid-filled vibration damping device of FIG. 1.

FIGS. 1–3 show a fluid-filled vibration damping bushing 10 for use as a suspension bushing or the like. In this embodiment, the fluid-filled vibration damping bushing 10 includes a first integrally vulcanized unit in the form of a bushing body 12, an orifice metal member 14, a stopper metal member 16 serving as a stroke distance adjusting structure, and a second integrally vulcanized unit 24 composed of a seal rubber layer 20 and a stopper rubber 22 integrally vulcanization bonded to an outer tubular metal member 18.

Figure 4:
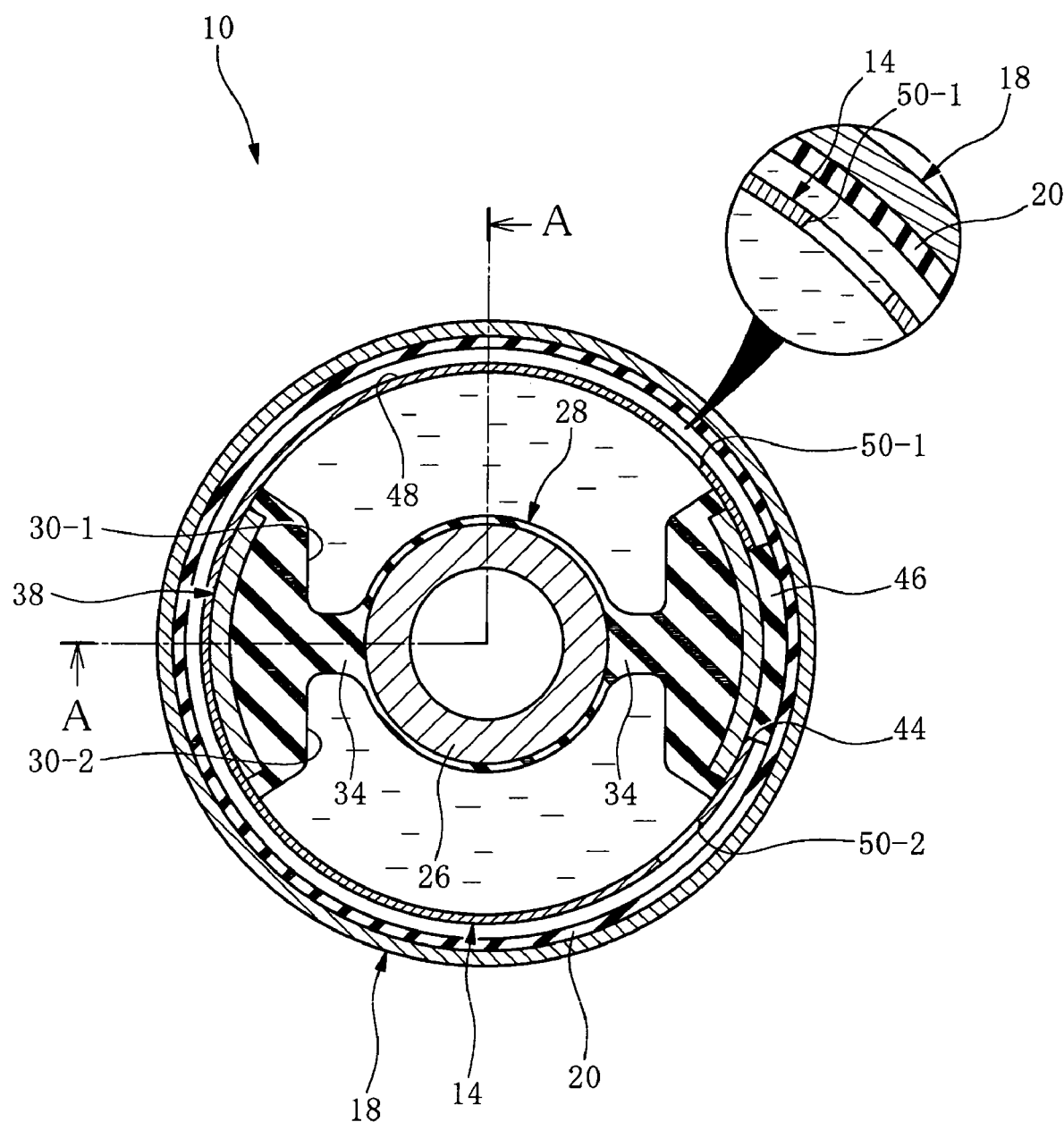
FIG. 4 is a transverse cross sectional view of the fluid-filled vibration damping bushing of FIG. 1, where components are assembled.
Figure 5A:
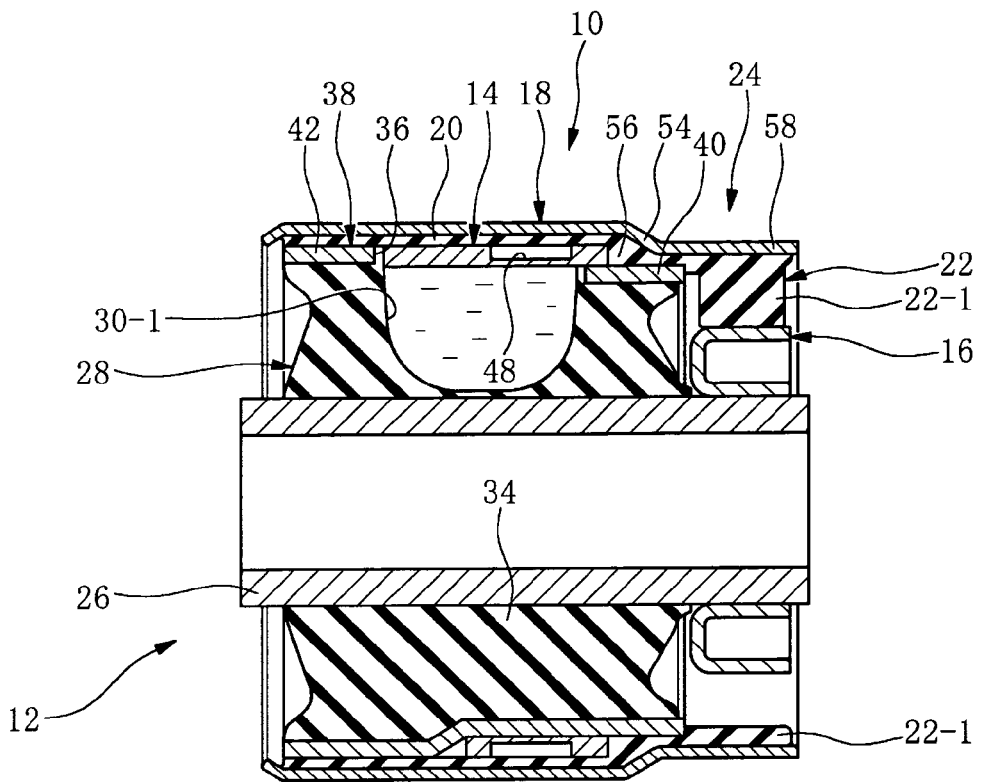
FIG. 5A is a cross sectional view taken along line A—A of FIG. 4.
Figure 5B:
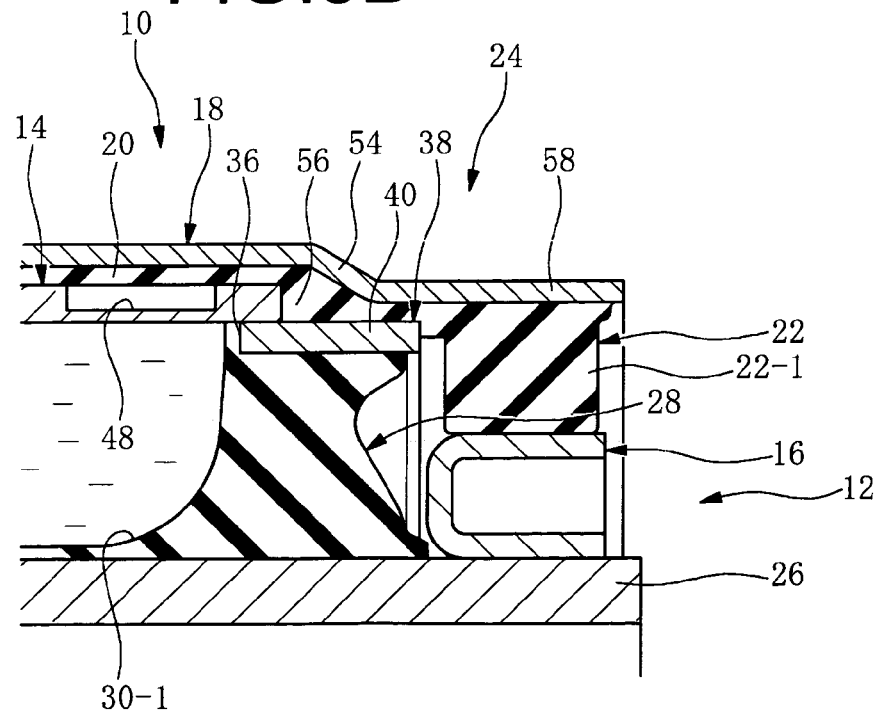
FIG. 5B is a fragmentary enlarged view of FIG. 5A.

As shown in FIGS. 4, 5A and 5B, the bushing body 12 has an inner tubular metal member 26 of round tubular shape, which is formed by cutting an extruded metallic pipe, for example, and a base rubber 28 integrally bonded by vulcanization onto an outer circumferential surface of the inner tubular metal member 26. On the base rubber 28 are formed a mutually independent first fluid chamber 30-1 and second fluid chamber 30-2 (hereinafter termed simply fluid chambers) that recess towards the inner tubular metal member 26 side from an outer circumferential surface of the base rubber 28. A non-compressible fluid is sealed within the fluid chambers 30-1 and 30-2. As shown in FIG. 4, the fluid chambers 30-1, 30-2 are divided in a circumferential direction by a rubber wall 34.

As shown in FIGS. 5A and 5B, a metal outer peripheral sleeve 38 has a pair of aperture windows 36 of shape corresponding to the shape of openings of the fluid chambers 30-1, 30-2. This metal outer peripheral sleeve 38 is formed by pressing a metallic plate, and is integrally bonded by means of vulcanization of a rubber material onto an outer circumferential surface of the base rubber 28. In this embodiment, the bushing body 12 is composed of the inner tubular metal member 26, the base rubber 28, the fluid chambers 30-1, 30-2 formed therein, and the outer peripheral sleeve 38 affixed to the outer circumferential surface of the base rubber 28.

In this embodiment, the bushing body 12, at a first side of the fluid chambers 30-1, 30-2 (the right end in FIG. 5A) has a smaller diameter than the other side (left end in FIG. 5A). More specifically, the outer peripheral sleeve 38 has a small diameter at an axially first end thereof located axially outside of the fluid chambers 30-1, 30-2, in comparison with an other axial end thereof. FIG. 5A shows a small-diameter portion 40 and a large-diameter portion 42.

Figure 9:
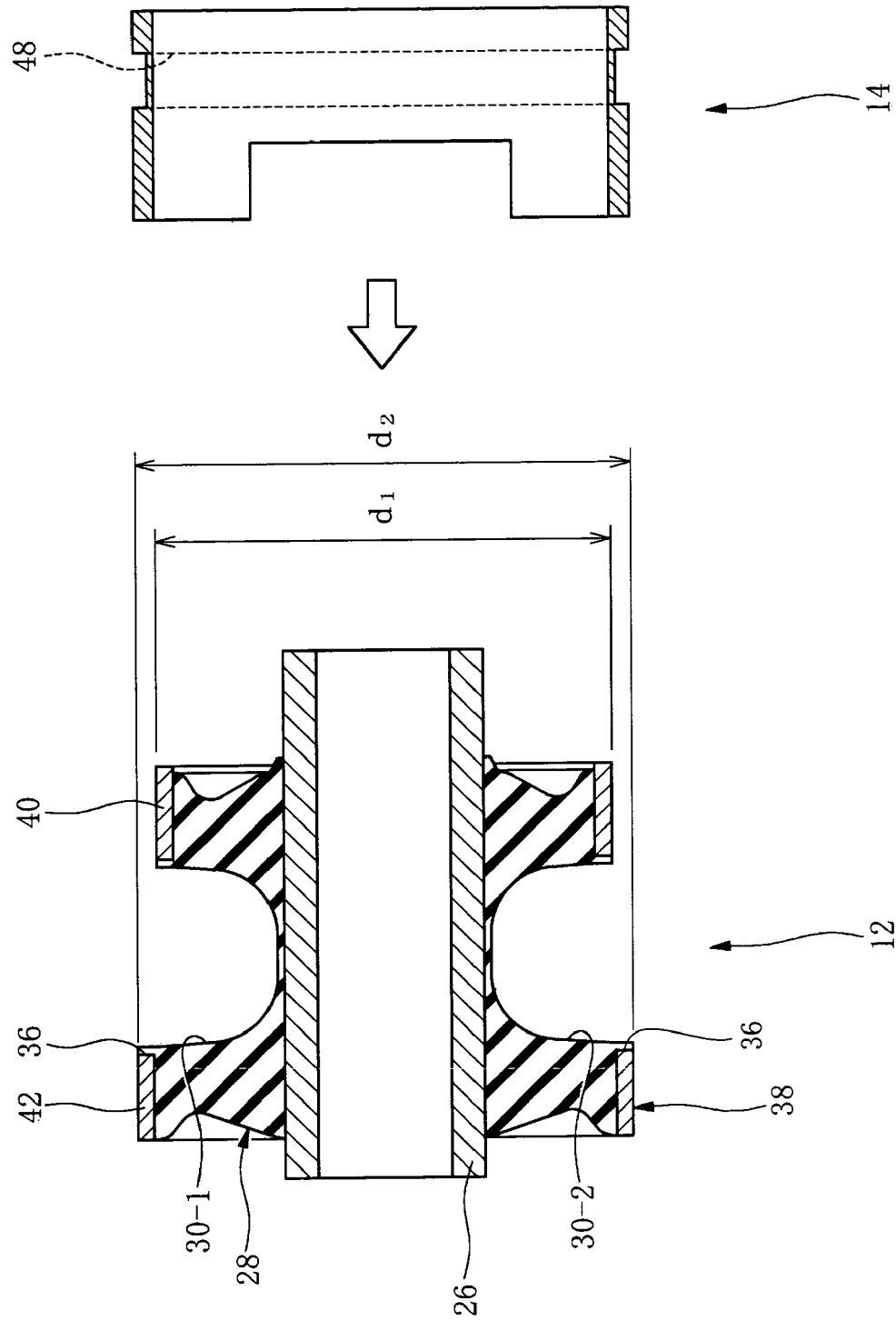
FIG. 9 is a view showing a step for assembling an orifice metal member against a bushing body of the fluid-filled vibration damping device of FIG. 1.

As shown in FIG. 5A and FIG. 9, the small-diameter portion 40 has outside diameter $d_1$ substantially the same as the inside diameter of the orifice metal member 14. The large-diameter portion 42, on the other hand, has outside diameter $d_2$ substantially the same as the outside diameter of the orifice metal member 14. As a result, the orifice metal member 14 can be attached onto an outer circumferential surface of the bushing body 12 by being passed through the small-diameter portion 40 in an axial direction, leftward in FIG. 9.

As shown in FIGS. 1, 2, 7A and 7B, the orifice metal member 14 is constituted as an unitary construction continuous in the circumferential direction. More specifically, the orifice member 14 is of C ring configuration having an opening 44 at a predetermined location in the circumferential direction; as shown in FIG. 4, it is disposed along the outer circumferential surface of the fluid chambers 30-1, 30-2 in the bushing body 12. A rubber layer 46 is inserted into the opening 44 of the C ring orifice metal member 14, so that the opening 44 is filled with the rubber layer 46.

As shown in FIGS. 4, 5A, 5B, 7A and 7B, an orifice passage 48 is formed on the orifice metal member 14, along the outer circumferential surface thereof. In this orifice metal member 14 are also disposed connecting holes 50-1 and 50-2 connected the orifice passage 48 with the fluid chambers 30-1, 30-2. The fluid sealed within the fluid chambers 30-1, 30-2 are able flow from one end to the other and back again through these connecting holes 50-1 and 50-2 and the orifice passage 48.

The outer tubular metal member 18 formed of a metallic pipe, for example, is a member for providing closure to the opening on the outer circumferential surface of the fluid chambers 30-1, 30-2 formed in the base rubber 28, from the outer peripheral side of the orifice metal member 14. It has a round tubular shape overall (see FIG. 1 and FIG. 2). As shown in FIG. 8A, on an inner circumferential surface of this outer tubular metal member 18 there is formed the seal rubber layer 20 extending substantially over its entire axial length, with the opening of the fluid chambers 30-1, 30-2 on an outer circumferential surface provided with a fluid-tight seal by this seal rubber layer 20.

As shown in FIGS. 5A, 5B and 8A, the outer tubular metal member 18 has a shoulder portion 54 of sloping shape, with a rubber contact portion 56 formed on the seal rubber layer 20 at the inner peripheral location of this shoulder portion 54. This rubber contact portion 56 comes into elastic contact with an axial end face, i.e., insertion side of the orifice metal member 14 on the right side in FIGS. 5A and 5B. By means of elastic contact of the rubber contact portion 56, the right end face of the orifice metal member 14 is sealed fluid-tightly, and by means of the abutting action of this rubber contact portion 56, the orifice metal member 14 is detained in the rightward direction in FIGS. 5A and 5B.

Figure 6:
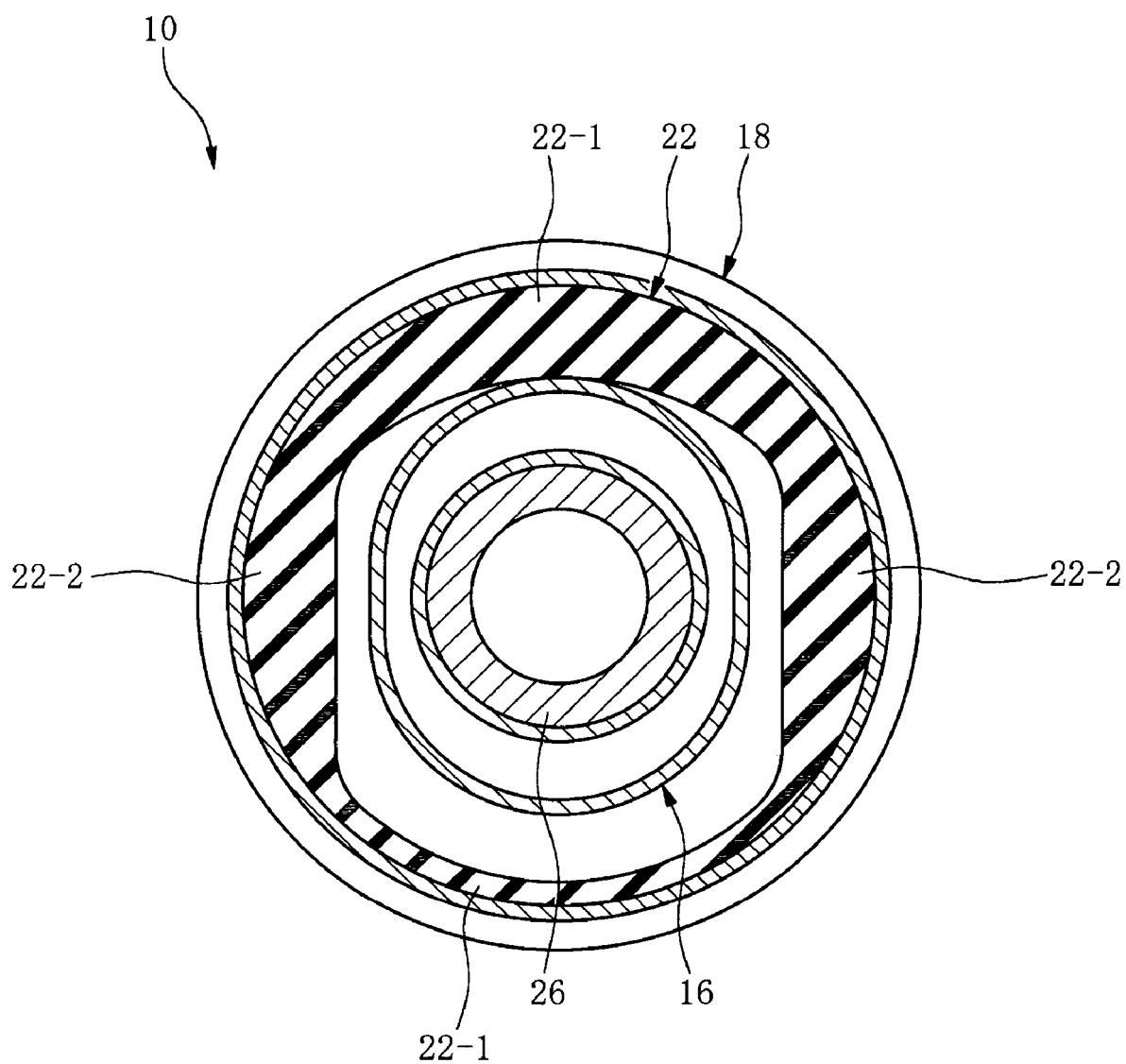
FIG. 6 is another transverse cross sectional view of the fluid-filled vibration damping bushing.
Figure 7B:
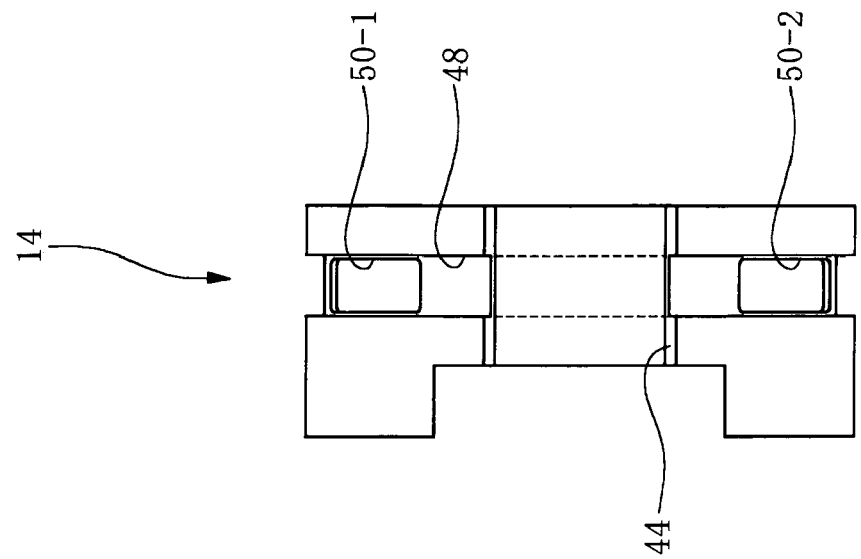
FIG. 7B is a left side elevational view of the orifice metal member of FIG. 7A.
Figure 7A:
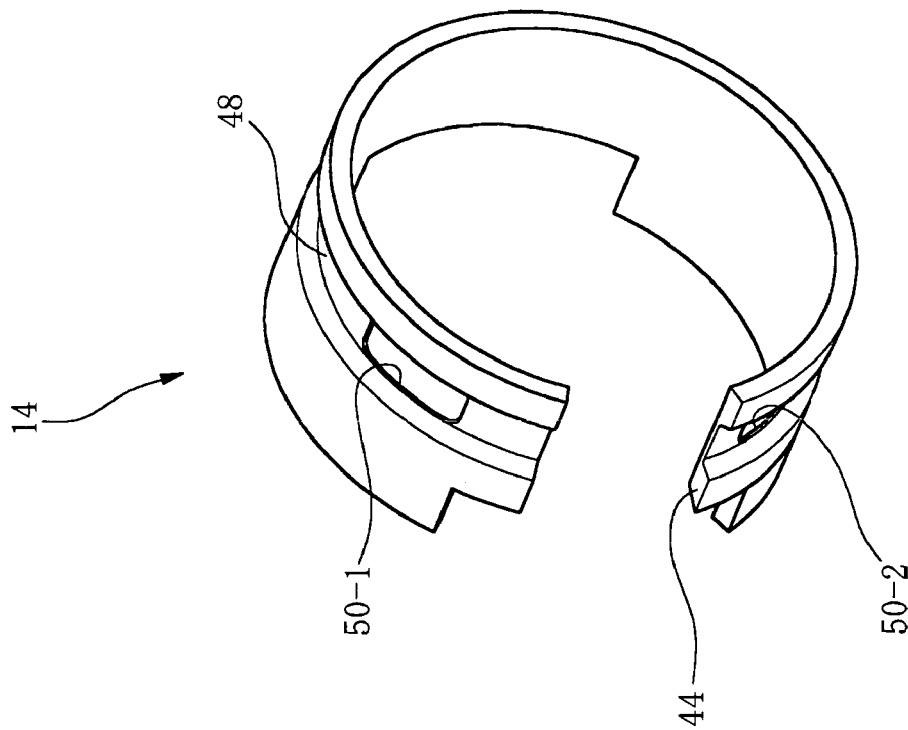
FIG. 7A is a perspective view of an orifice metal member of the fluid-filled vibration damping bushing of FIG. 1.

The outer tubular metal member 18 has a small-diameter portion 58 continuing on from this shoulder portion 54, with the stopper rubber 22 being integrally vulcanization bonded to an inner circumferential surface of the small-diameter portion 58 (see FIG. 8A). Here, the stopper rubber 22 has a stopper portion 22-1 in an axis-perpendicular direction (vertical direction in FIG. 6) connecting the fluid chamber 30-1 and the fluid chamber 30-2 and, at a right angle thereto (lateral direction in FIG. 6) a pair of stopper portions 22-2 in opposition in the axis-perpendicular direction. That is, the stopper rubber 22 is disposed at a circumferential location corresponding to the first fluid chamber 30, for restricting relative displacement of the inner tubular metal member 26 and the outer tubular metal member 18 in the axis-perpendicular direction.

Meanwhile, on the outer circumferential surface of the inner tubular metal member 26, the stopper metal member 16 of ring shape of aluminum die cast (see FIG. 1 and FIG. 2) is affixed by press-metal member. As shown in FIGS. 5A and 5B, the stopper metal member 16 is attached to the inner tubular metal member 26 at a location opposite to the stopper rubber 22 in the axis-perpendicular direction.

That is, in this embodiment, the stopper rubber 22, which conventionally was constituted as a separate element from the base rubber 28 and disposed within the fluid chambers 30-1, 30-2, is instead integrally bonded by vulcanization to the inner circumferential surface of the outer tubular metal member 18 in a form projecting towards the inner tubular metal member 26, at a location outside the fluid chambers 30-1, 30-2 and axially outward with respect to the base rubber 28.

The fluid-filled vibration damping bushing 10 of this embodiment may be manufactured in the following manner. First, as shown in FIG. 9, the base rubber 28 is integrally vulcanization bonded to the inner tubular metal member 26 and the outer peripheral sleeve 38, to produce a first integrally vulcanized unit, namely, the bushing body 12. Then, after subjecting the outer peripheral sleeve 38 to a drawing operation in the direction of diameter reduction, the orifice metal member 14 of aluminum die cast is inserted in the axial direction until reaching the location of the opening of the fluid chambers 30-1, 30-2.

Figure 10:
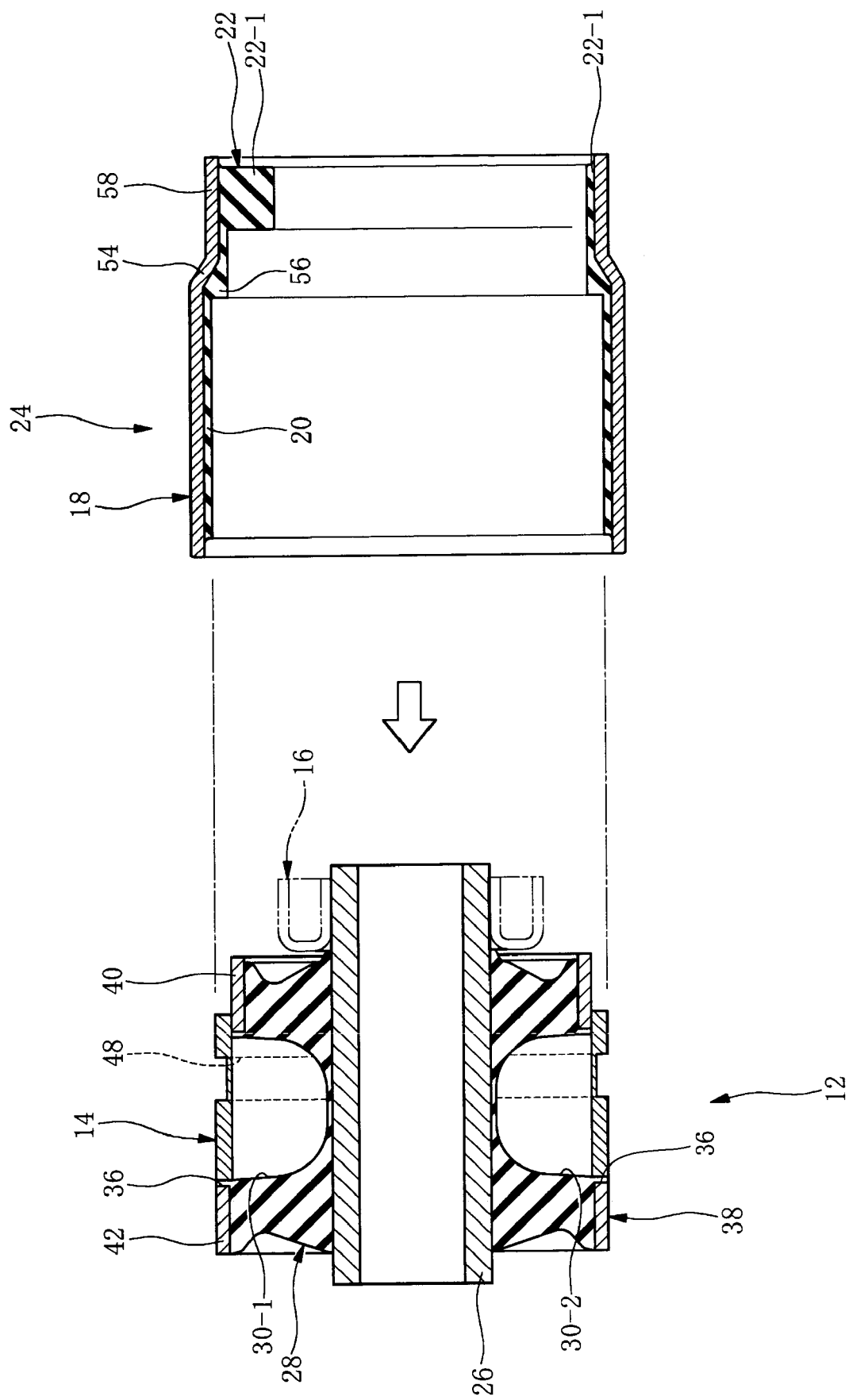
FIG. 10 is a view showing another step proceeding to the step of FIG. 9.

Then, as shown in FIG. 10, the second integrally vulcanized unit 24 composed of the inner circumferential surface seal rubber layer 20 and the stopper rubber 22 integrally bonded by vulcanization to the outer tubular metal member 18, oriented facing leftward in the drawing, is attached metal member externally thereabout, and the outer tubular metal member 18 is then subjected to a drawing operation in the direction of diameter reduction, after which the end face of the left end in the drawing is caulked to secure the outer tubular metal member 18 of the bushing body 12. Then, the ring shaped stopper metal member 16 is attached by being press-fit onto the inner tubular metal member 26. This completes the fluid-filled vibration damping bushing 10 of the embodiment shown in FIGS. 1 and 2.

In the fluid-filled vibration damping bushing 10 of the embodiment described hereinabove, two components, namely, a first integrally vulcanized unit consisting of the bushing body 12, and the second integrally vulcanized unit 24 composed of the outer tubular metal member 18, the seal rubber layer 20, and the stopper rubber 22, whereby the number of vulcanized parts may be reduced as compared to the prior art, so that the costs associated with the fluid-filled vibration damping bushing 10 can be lowered.

In the embodiment herein, since the stopper rubber 22 has been removed from the fluid chambers 30-1, 30-2 and is instead integrally vulcanization bonded to the outer tubular metal member 18, the problems occurring in the past in associated with the stopper rubber 22 being situated inside the fluid chamber, namely, the problems of abraded particulate material and of diminished stopper performance of the stopper rubber 22 due to the liquid, can be resolved. At the same time, the problem of strain of the base rubber 28, and in particular of significant deformation of the area around the fluid chamber 30-1, 30-2 inside faces, due to the stopper rubber 22 contacting the fluid chamber 30-1, 30-2 inside faces of the base rubber 28 when twisting force is input can be resolved as well.

In this embodiment, since the stopper rubber 22, in a form separate from the orifice metal member 14, is situated outside the fluid chambers 30-1, 30-2, the orifice metal member 14 can take the form of an unitary construction of C ring configuration continuous in the circumferential direction, and can be attached to the bushing body 12 in the axial direction. Thus, the orifice metal member 14, which conventionally was composed of two parts, can now consist of a single part, whereby the cost of the fluid-filled vibration damping bushing 10 may be reduced further.

Additionally, on the seal rubber layer 20 on the inner circumferential surface of the outer tubular metal member 18, there is formed the rubber contact portion 56 that abuts the axial end of the orifice metal member 14 on the side opposite from the insertion side, sealing the axial end face of the orifice metal member 14 and serving as a detent for the orifice metal member 14. Thus, even if the orifice member 14 is attached by being inserted in the axial direction so as to pass through the small-diameter portion 40 at a first axial end of the bushing body 12, it is nevertheless possible to provide a good seal to the axial end face of the orifice member 14, as well as to detain it therein.

Figure 11:
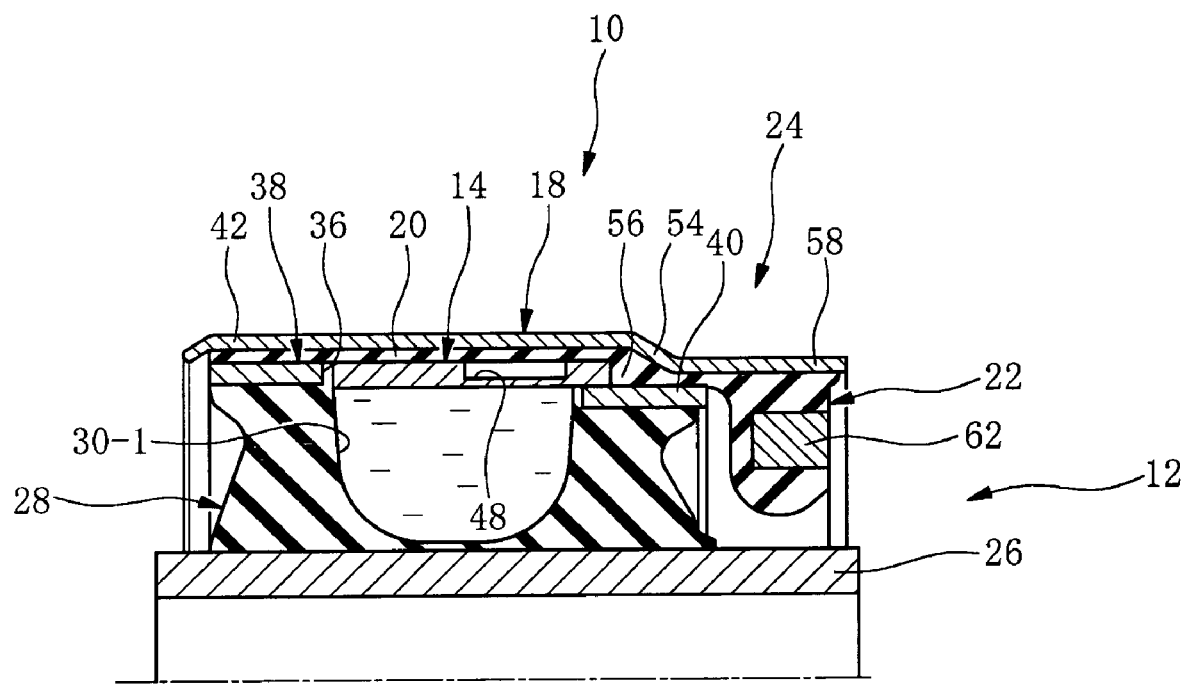
FIG. 11 is a fragmentary cross sectional view of a fluid-filled vibration damping bushing of construction according to another embodiment of the present invention.

In the embodiment hereinabove, the ring shaped stopper metal member 16 is attached by being press-fit onto the inner tubular metal member 26, with the stopper rubber 22 abutting this stopper metal member 16 in the axis-perpendicular direction. However, the stopper metal member 16 is not an essential element of the invention, and may be dispensed with as shown in FIG. 11. In the embodiment shown in FIG. 11, a metal member 62 is embedded in the interior of the stopper rubber 22.

Figure 12:
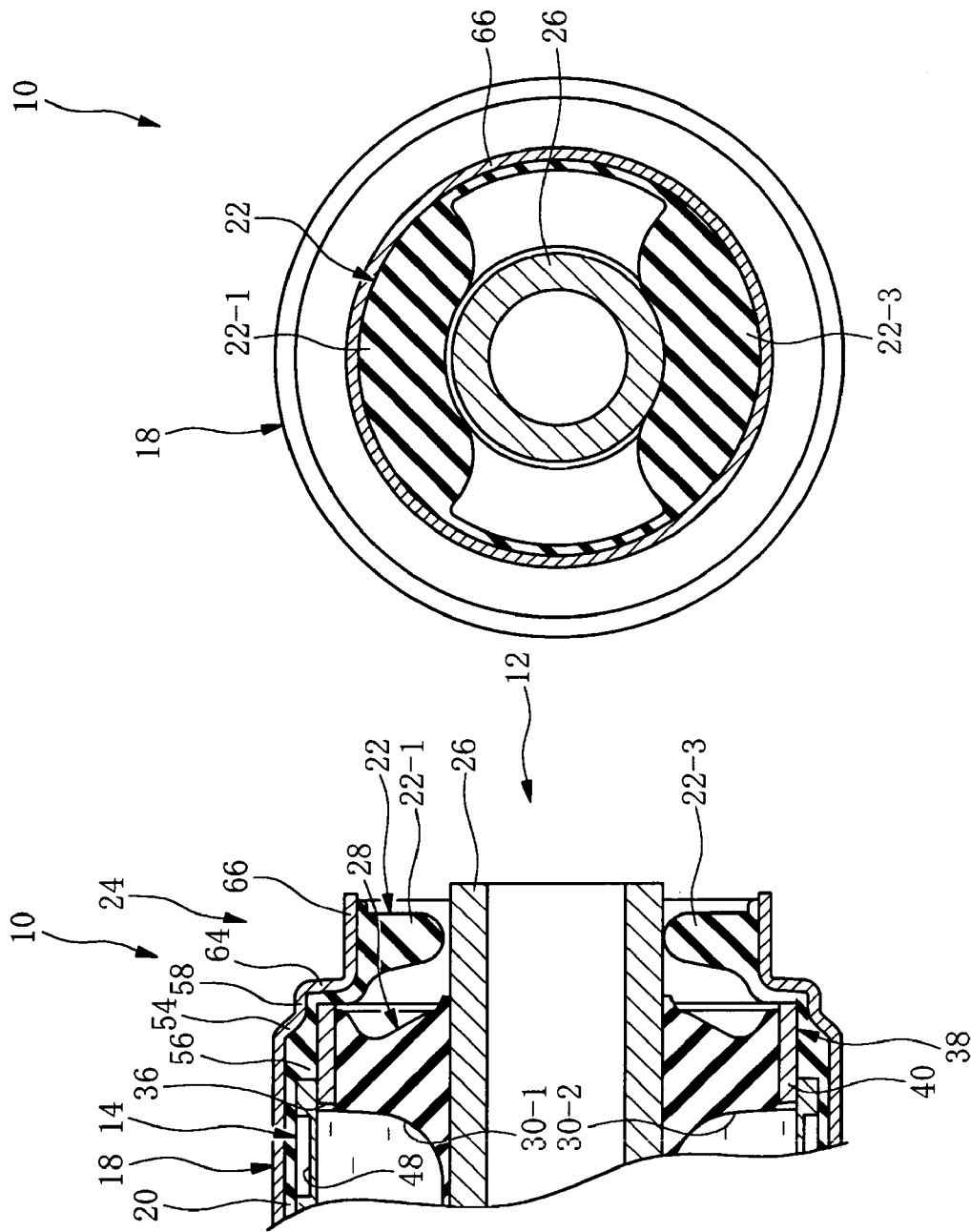
FIGS. 12A and 12B are fragmentary axial cross sectional and transverse cross sectional views of a fluid-filled vibration damping bushing of construction according to yet another embodiment of the present invention.

FIGS. 12A and 12B depicts yet another embodiment of the invention, wherein the sloping shoulder portion 54 and the small-diameter portion 58 continuing on therefrom are followed by a second shoulder portion 64 that descends in the axis-perpendicular direction towards the inner tubular metal member 26 side, and a small-diameter portion 66 continuing on therefrom, with the stopper rubber 22 being integrally vulcanization bonded therewith. Here, the stopper rubber 22 has the upper stopper portion 22-1 and a lower stopper portion 22-3, which are mutually independent of one another. In this embodiment, the outer tubular metal member 18 is fastened to the bushing body 12 with the second shoulder portion 64 abutting the right end face of the bushing body 12 in the drawing, via the seal rubber layer 20.

In the fluid-filled vibration damping bushing 10 of this embodiment, the small-diameter portion 66 is formed in the outer tubular metal member 18 and the stopper rubber 22 is integrally vulcanization bonded to the inner circumferential surface thereof, whereby the gap between an inner circumferential surface of the inner tubular metal member 26 and the stopper rubber 22 can readily be given the appropriate spacing needed for stopper action. Additionally, when the outer tubular metal member 18 is fitted externally onto the bushing body 12, the relative positional relationship of the bushing body 12 and the outer tubular metal member 18 can be readily positioned. Namely, the second shoulder portion 64 in this embodiment provides a stroke distance adjusting structure for adjusting a distance in the axis-perpendicular direction between a protruding end face of the stopper portion 22 in view of the required stopper action.

Figure 13:
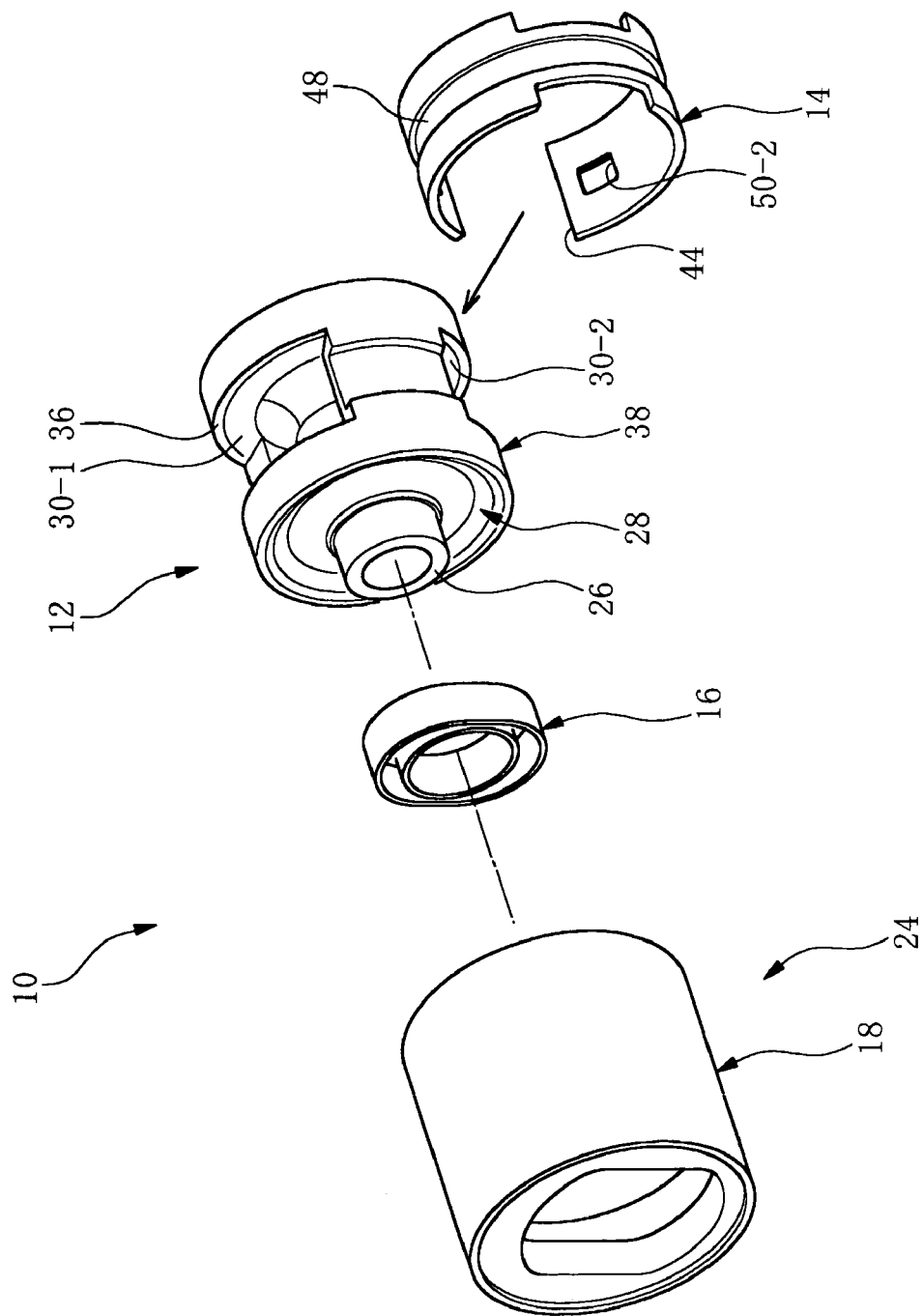
FIG. 13 is an exploded perspective view of a fluid-filled vibration damping bushing of construction according to still another embodiment of the present invention.
Figure 14:
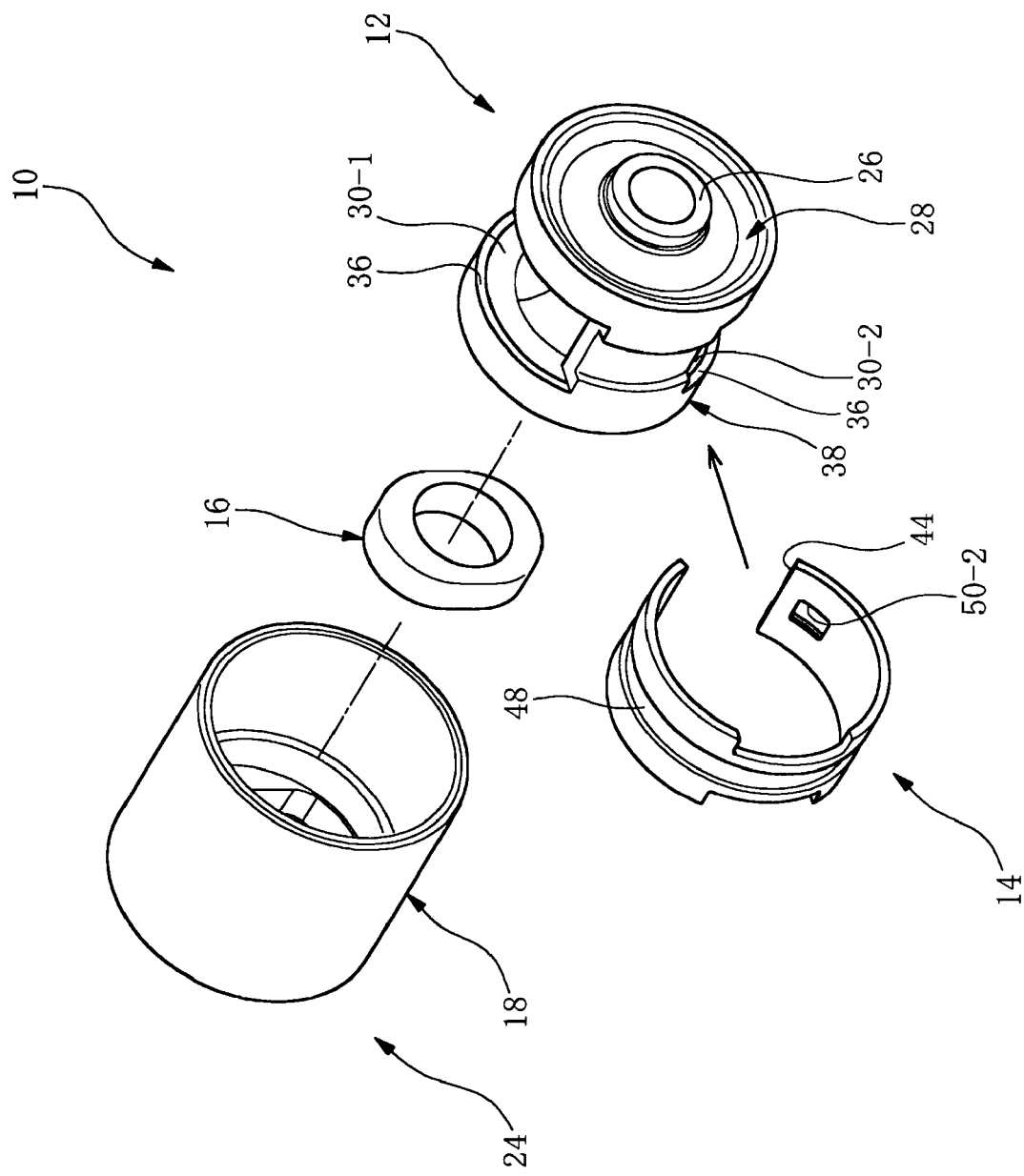
FIG. 14 is another exploded perspective view of the fluid-filled vibration damping bushing of FIG. 13.
Figure 15:
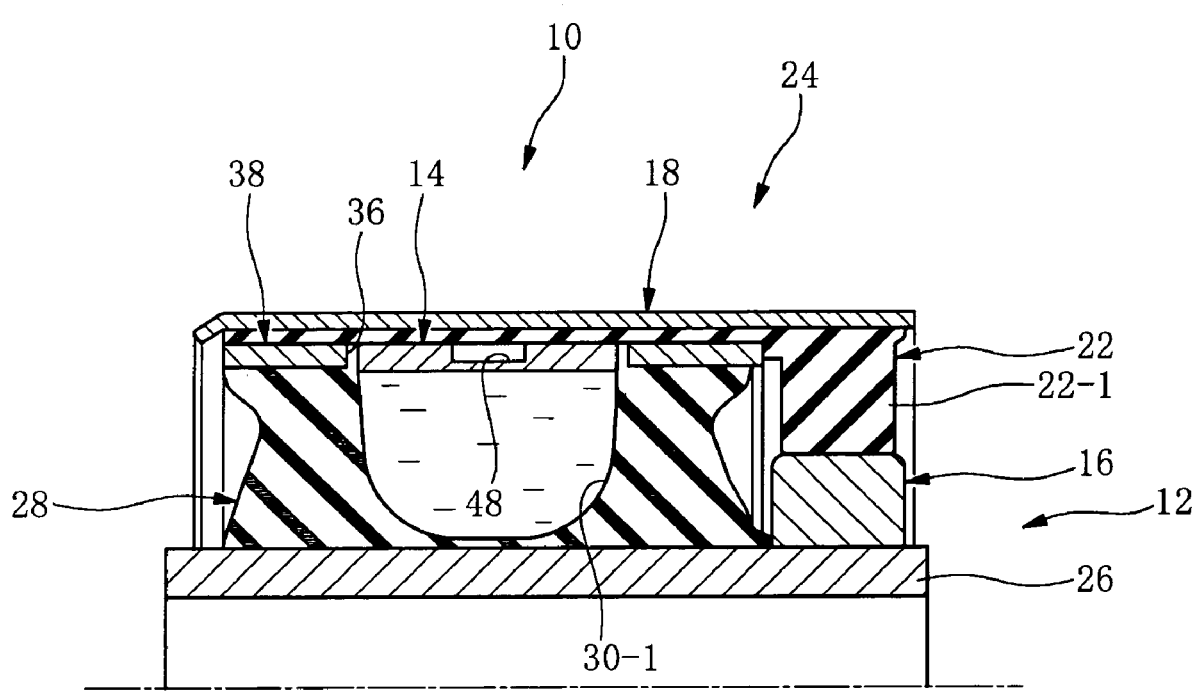
FIG. 15 is a fragmentally cross sectional view of the fluid-filled vibration damping bushing of FIG. 13 where the components are assembled.
Figure 16:
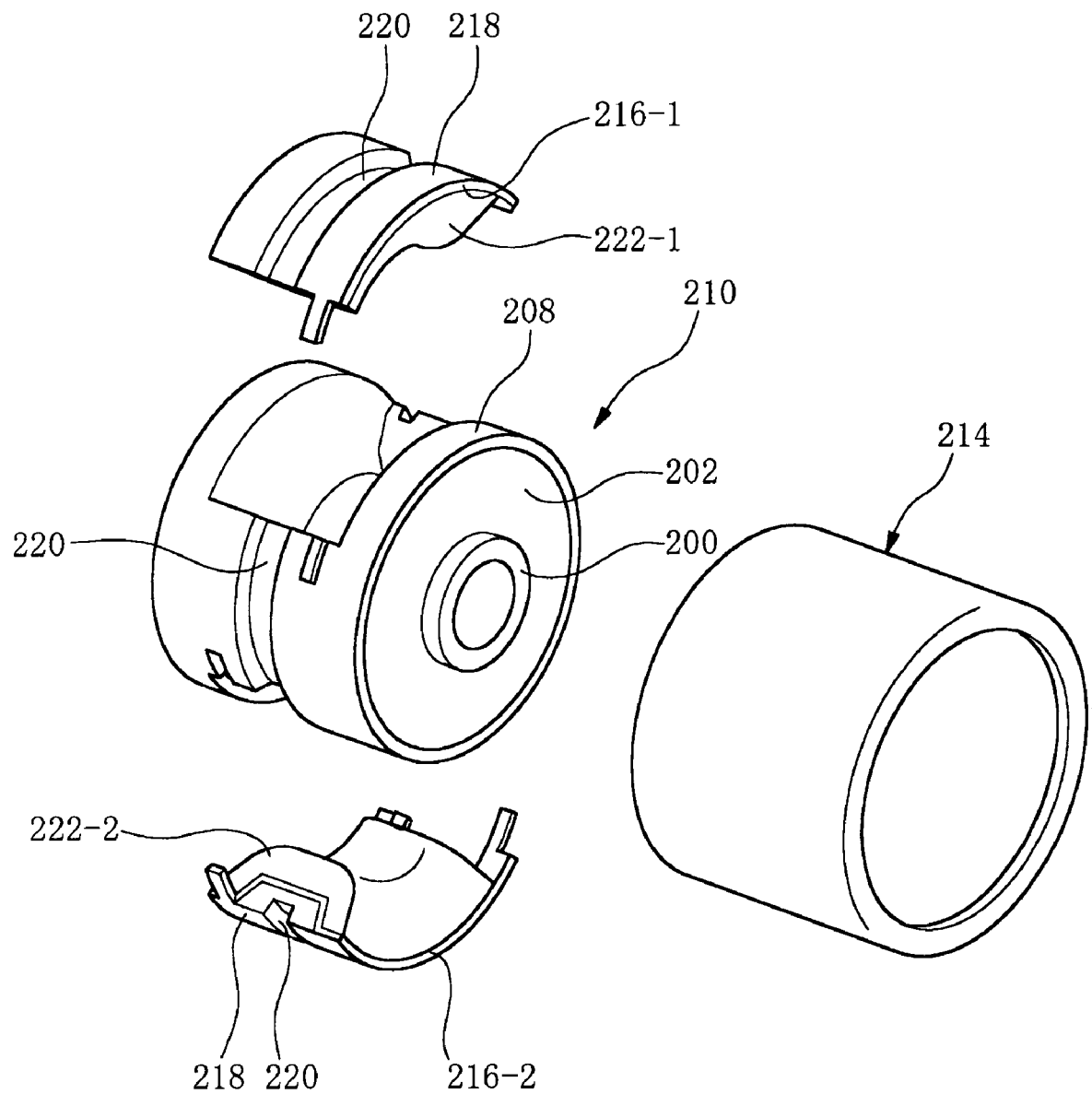
FIG. 16 is an exploded perspective view of an example of a conventional fluid-filled vibration damping bushing.
Figure 17A:
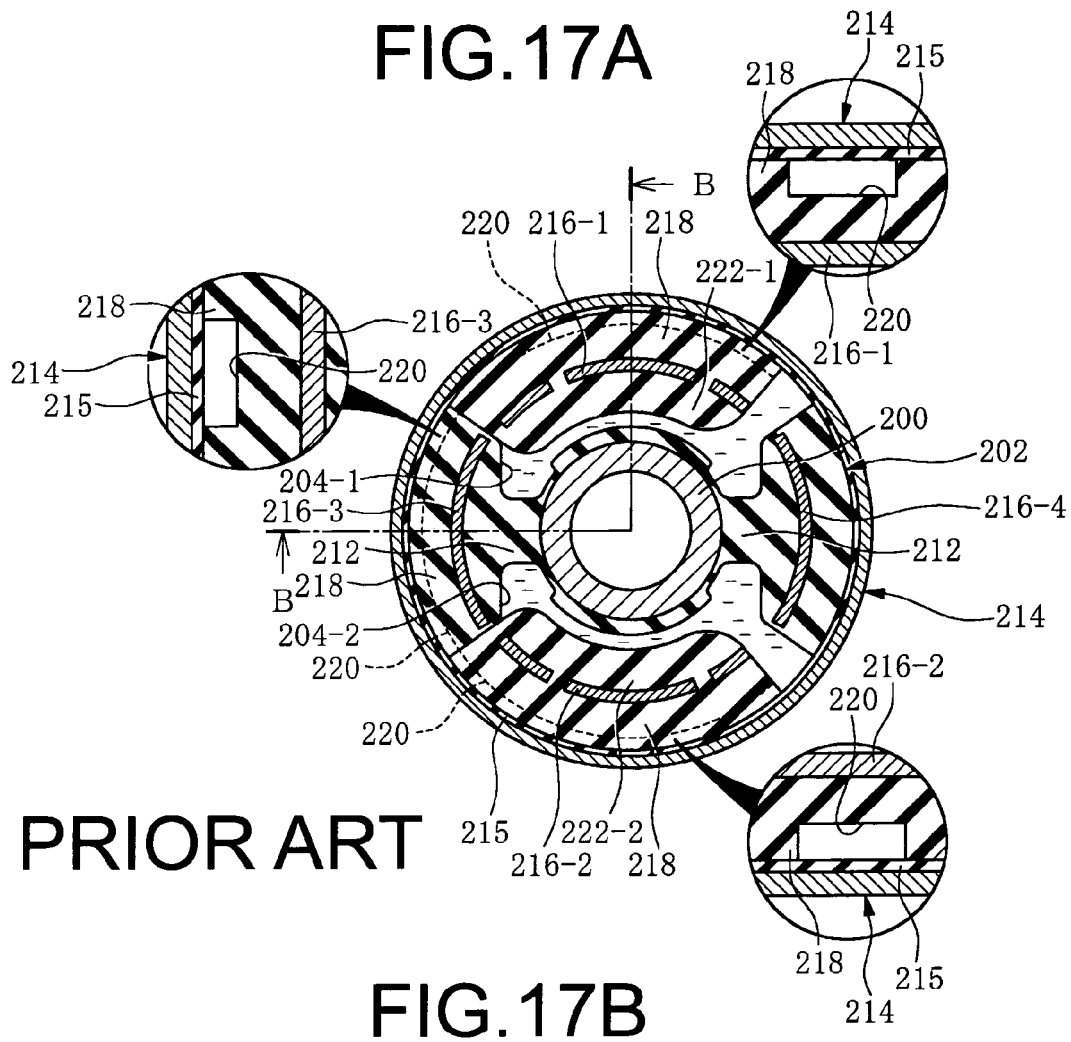
FIGS. 17A and 17B are transverse cross sectional and axial cross sectional view of the fluid-filled vibration damping bushing of FIG. 16.
Figure 17B:
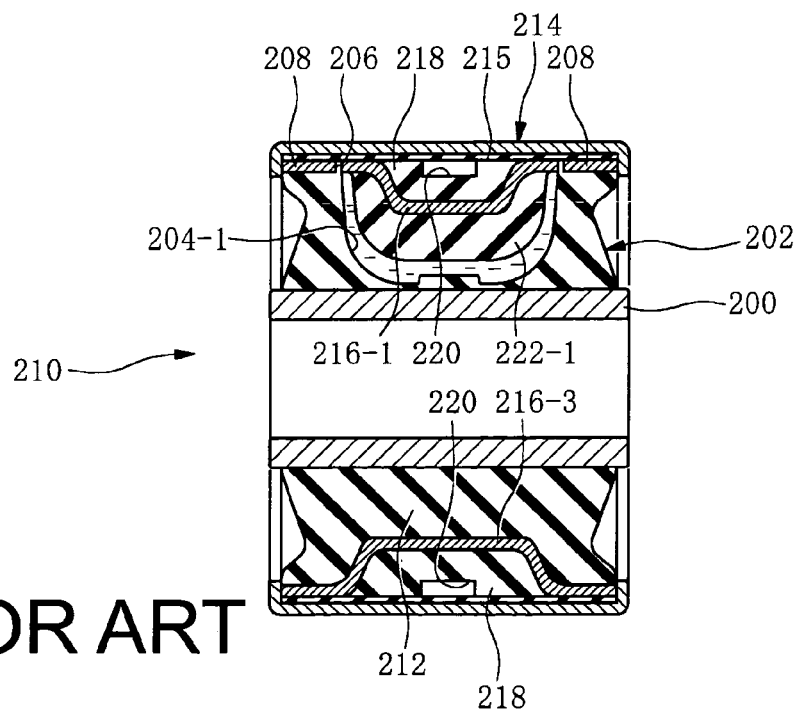

Yet another embodiment of the invention is depicted in FIGS. 13–15. In the preceding embodiments, the orifice metal member 14 of C ring shape was attached inserted to the bushing body 12 in the axial direction. In the present embodiment, however, the orifice metal member 14 of C ring shape is attached to the bushing body 12 onto it in the axis-perpendicular direction. For this reason, in this embodiment, a spacing between adjacent circumferential edges of the fluid chamber 30-1 and the fluid chamber 30-2 in the bushing body 12 is made smaller than a spacing between the two edge of the opening 44 of the orifice metal member 14 of C ring shape, i.e. a spacing of the circumferential edges of the orifice metal member 14, whereby the orifice metal member 14 can be snapped onto the bushing body 12 from the axis-perpendicular direction.

In this embodiment, since the orifice metal member 14 is attached fitted onto the bushing body 12 from the axis-perpendicular direction, as shown in FIG. 15, there is no need for a stepped configuration in which outside diameter differs between one axial and the other of the fluid chambers 30-1, 30-2 in the bushing body 12. Accordingly, as shown in FIG. 15, outside diameter at one end and outside diameter at the other end are the same.

While the presently preferred embodiments of the invention have been described in detail by way of example, it is to be understood that the present invention may be embodied with various other changes, modifications and improvements, which may occur to those skilled in the art, without departing from the spirit and scope of the invention defined in the following claims.

For instance, the principle of the present invention may be applied to another type of fluid-filled cylindrical bushing as disclosed in JP-A-2003-194138. Since this type of bushing needs a great amount of fluid flow through the orifice passage in order to exhibit vibration damping effect on the basis of resonance or flow action of the fluid, the use of the outside stopper structure according to the present invention ensures a wide volume of the fluid chamber, assuring a sufficient fluid flow amount with high efficiency. Additionally, the use of the outside stopper structure according to the present invention is able to reduce the outside diameter of the bushing, whereby the bushing can be provided with a compact size.

What is claimed is:

1. A fluid-filled vibration damping bushing comprising:
   (I) a bushing body having an inner tubular metal member, an outer peripheral sleeve disposed coaxially about the inner tubular metal member and a base rubber interposed between and elastically connecting the inner tubular metal member and the outer peripheral sleeve, the base rubber having a pair of depressions recessed towards an inner tubular metal member side and open in an outer circumferential surface of the base rubber, so as to provide mutually independent first and second fluid chambers having a non-compressible fluid sealed therein, and the outer peripheral sleeve having a pair of aperture window of shape corresponding to openings of the first and second fluid chambers;
   (II) an orifice member at least partially defining an orifice passage extending between the openings of the first and second fluid chamber so that the fluid sealed within the first and second fluid chambers is caused to flow between the chambers;
   (III) an outer tubular metal member having a seal rubber layer integrally bonded by vulcanization to an inner circumferential surface thereof for liquid-tight sealing of the first and second fluid chambers, and fastened to an outer circumferential surface of the outer peripheral sleeve via the seal rubber layer, closing off the openings of the first and second fluid chambers; and
   (IV) a stopper rubber constituted as a separate element from the base rubber, disposed at a circumferential location corresponding at a minimum to either the first or second fluid chamber, for restricting relative displacement of the inner tubular metal member and the outer tubular metal member in an axis-perpendicular direction,
   wherein the stopper rubber is formed separately from the orifice member and is bonded to a first axial end portion of the outer tubular metal member at a location outside the first and second fluid chambers so as to face toward the inner tubular metal member, and the outer tubular metal member with the stopper rubber attached thereto is inserted onto the bushing body from an other axial end thereof.

2. A fluid-filled vibration damping bushing according to claim 1, wherein the orifice member is an unitary construction continuous in a circumferential direction, and a first end of the bushing body located axially outward of the first and second fluid chambers is made smaller in diameter than an other axial end thereof, the orifice member being assembled by being passed through a small-diameter portion at the first end and inserted in an axial direction as far as the openings of the first and second fluid chambers open in an outer circumferential surface of the bushing body.

3. A fluid-filled vibration damping bushing according to claim 2, wherein a rubber contact portion is formed on the seal rubber layer of the inner circumferential surface of the outer tubular metal member, the rubber contact portion contacting a first axial end of the orifice member opposite from an insertion side of the orifice member, and constituting a seal for an axial end face of the orifice member and a detent for the orifice member.

4. A fluid-filled vibration damping bushing according to claim 1, wherein the orifice member constitutes an unitary structure of C ring shape continuous in the circumferential direction, and a spacing between adjacent circumferential edges of the first fluid chamber and the second fluid chamber in the bushing body is smaller than a spacing between circumferential edges of the orifice member, the orifice member being attached by being snapped onto the bushing body in the axis-perpendicular direction.

5. A fluid-filled vibration damping bushing according to claim 1, wherein the outer tubular metal member has a shoulder portion at a location thereof situated at an axial end of the outer peripheral sleeve in the bushing body, the shoulder portion facing the inner tubular metal member side and contacting the axial end of the outer peripheral sleeve, and wherein the stopper rubber is integrally bonded to an inner circumferential surface of a small-diameter portion continuously extending from the shoulder portion.

6. A fluid-filled vibration damping bushing according to claim 1, further comprising a stroke distance adjusting structure for adjusting a distance in the axis-perpendicular direction between a protruding end face of the stopper rubber and an inner circumferential surface of the inner tubular metal member.

* * * * *